United States Patent
Schubert et al.

[15] 3,635,030
[45] Jan. 18, 1972

[54] DEVICE FOR PRODUCING BURNABLE GASES FOR THRUST ENGINES

[72] Inventors: Johannes Schubert, Unterhaching; Rolf Fuchs, Poing, both of Germany

[73] Assignee: Bolkow Gesellschaft mit beschraenkter Haftung, Ottobrunn bei Munich, Germany

[22] Filed: Nov. 5, 1969

[21] Appl. No.: 871,012

Related U.S. Application Data

[62] Division of Ser. No. 671,658, Sept. 29, 1967, abandoned.

[30] Foreign Application Priority Data

Oct. 18, 1966 Germany.....................P 15 71 248.8

[52] U.S. Cl.............................60/251, 60/39.12, 60/39.47, 60/39.48, 60/39.49, 60/256, 60/259, 60/270 S
[51] Int. Cl.........................................F02k 7/10, F02k 9/06
[58] Field of Search...............60/39.12, 39.49, 39.47, 39.48, 60/251, 250, 259, 256, 200, 209, 219, 220, 270 S

[56] References Cited

UNITED STATES PATENTS

| | | | |
|---|---|---|---|
| 2,816,419 | 12/1957 | Mueller | 60/39.48 |
| 3,132,475 | 5/1964 | Hopper | 60/39.48 |
| 3,159,104 | 12/1964 | Hodgson | 60/251 |
| 3,340,691 | 9/1967 | Mangum | 60/250 |
| 3,350,887 | 11/1967 | Leunig | 60/251 |

*Primary Examiner*—Douglas Hart
*Attorney*—McGlew and Toren

[57] ABSTRACT

Burnable gases under pressure for operating engines such as thrust engines and particular rocket and ramjet engines are produced by arranging together two solid propellant charges, one of which comprises an auxiliary propellant charge having a high thermal efficiency and the other constituting a main propellant charge comprising a material of low heat of fusion and evaporation. The auxiliary charge is ignited by a fuse device and will burn off adjacent the main charge but shielded therefrom by a burn-off insulation. The burnable gases which are produced are directed by their own pressure through a gas duct into a combustion chamber where they are admixed with an oxidizer which may be supplied under the pressure force of the gases themselves.

17 Claims, 7 Drawing Figures

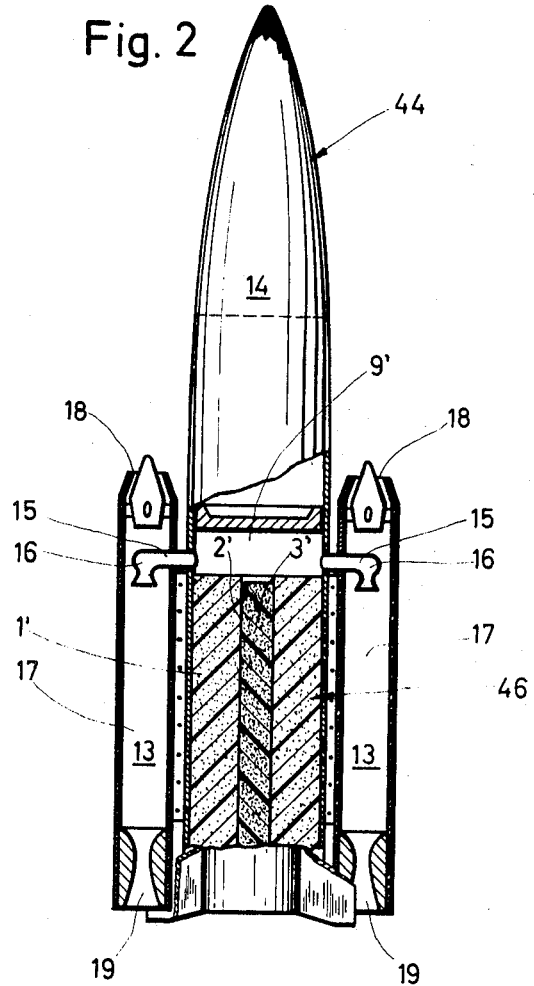
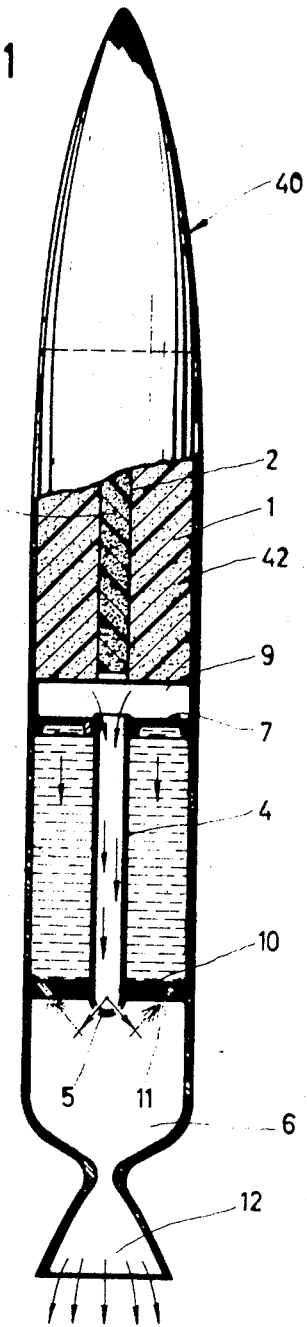
Fig. 2
Fig. 1
INVENTORS
Johannes Schubert
Rolf Fuchs
ATTORNEYS

DEVICE FOR PRODUCING BURNABLE GASES FOR THRUST ENGINES

This is a division of application Ser. No. 671,658, filed Sept. 29, 1967, now abandoned.

SUMMARY OF THE INVENTION

This invention relates, in general, to a method of generating and utilizing burnable gases and to thrust engines for using such gases, and in particular, to a new and useful method and device for effecting the burning of an auxiliary charge of high thermal efficiency adjacent a main propellant charge of a material of low heat of fusion and evaporation in a manner such that the gases generated are permitted to flow under their own pressure into a combustion chamber for combining with additional oxidizer to effect complete combustion.

The method of the invention for producing burnable gases under pressure for thrust engines is particularly applicable to rocket and ramjet engines. The gases are produced from a combination of two solid propellant charges, namely an auxiliary propellant charge with preferably compensated oxygen balance and from a low-oxygen or oxygen-free main propellant charge. It is generally known in rocket engineering that liquid fuel components can be conveyed from a storage tank into a combustion chamber utilizing the pressure generated by the composition of an auxiliary propellant charge. It is also known how to transfer solid-fuel-rich propellant charges into a fuel gas usable with lithergole engines by partial combustion using an under supply of oxygen. The fuel gas is conveyed to a combustion chamber and then burned completely as it is mixed with air or another oxidizer. In solid fuel engines the propellant charge is arranged with a predetermined mixture ratio in the combustion chamber. In lithergole engines, such an arrangement using single stage combustion brings about an uneven mixture formation and hence an unstable irregular combustion which results in a reduction of the efficiency of the engine. For this reason, in the known lithergole engines the solid-fuel-rich propellant charge is located outside the combustion chamber where it is preburned with a small quantity of air or oxidizer and then is directed into the main combustion chamber in which the main combustion takes place. For the main combustion the partially burned relatively low energy fuel gas will be employed.

The method of transforming fuel-rich solid propellant charges into fuel gas by partial combustion has the disadvantage that this partial combustion with a pronounced air or oxidizer deficiency and operable as a low-temperature process is difficult to stabilize. The combustion proceeds much too slowly, and moreover the combustion chamber receives preburned and hence relatively low energy fuel gases which adversely affects the efficiency of the engine. In addition, in a low-temperature process, soot is formed which burns very poorly and can be conveyed away only partially as it tends to bake.

In accordance with the present invention, the method avoids the above-mentioned disadvantages and produces a high-energy burnable gas from suitable solid propellants. The propellant charge comprises an auxiliary propellant charge of high thermal efficiency and main propellant charge of a material of low heat and fusion of evaporation, for example, polyethylene, paraffins with more than eight carbon atoms, paraffin derivatives such as wax and alcohols, and acids such as stearic acids and paraffin acids and the esters of nitric acid. The auxiliary and the main charges are arranged such that the main charge is fused by the burn-off of the auxiliary propellant charge and it is evaporated or sublimated or cracked during this process. During the burn-off of the auxiliary propellant charge therefore its heat acts on the main propellant charge so that it melts and gasifies this charge in a manner similar to the heating of a wax of a candle as it burns. The formed burnable gases are conveyed through connecting lines into the combustion chamber by the pressure formed by the burn-off of the auxiliary propellant charge and the resultant gases are burned in a combustion chamber with air or oxygen to create thrust gases directed through an expansion nozzle of a thrust engine. In the application of the invention method to lithergole engines, the pressure created by the auxiliary propellant charge is used to press the liquid oxidizer into the combustion chamber for ignition with the gases which are produced.

To achieve a good heat transfer from the auxiliary propellant charge to the main propellant charge, the auxiliary propellant charge is advantageously embedded in the main propellant charge in the manner of a wick of a candle or in one or more layers which are arranged to increase the common surfaces of the two propellant charges for the purposes of improving and accelerating the heat transfer from the auxiliary propellant charge to the main propellant charge. In addition, in order to obtain a specified thrust, the invention contemplates the arrangement of different auxiliary propellant charges or main propellant charges in various successively arranged layers which are oriented to provide for the type of burn-off desired and the thrust characteristics which must be obtained.

A particular advantage of the invention is that by a favorable burn-off condition of the auxiliary propellant charge, a uniform classification of the main propellant charge is obtained, and thus the high efficiency of the overall process is assured. The main propellant charge need only be fused or evaporated and sublimated and no chemical reaction need take place which requires heat. Because the auxiliary propellant charge is used for conveying the burnable gases to the combustion chamber, it is assured that these high-energy burnable gases will be delivered in a quantity corresponding to the supplied air or oxidizer in an optimum mixture, and thereafter excellent burn-out and high performance of the engine will be assured.

Accordingly, it is an object of this invention to provide an improved method for producing burnable gases under pressure for engines which comprises arranging an auxiliary propellant charge of a high thermal efficiency directly adjacent a main propellant charge of a material of low heat of fusion and evaporation and igniting the auxiliary propellant charge to cause its burn-off sufficiently close to the main propellant charge so that the main propellant charge is evaporated or sublimated, and conveying the gases thus formed under a pressure-conveying force supplied by the burn-off of the gases of the auxiliary charge into a combustion chamber for additional burning.

A further object of the invention is to provide a method of generating and using burnable gases wherein the gases formed by the burn-off of a main charge are conducted by the force of the burn-off of an auxiliary charge through a conduit and into a combustion chamber which is supplied with oxygen which is conveyed to the combustion chamber under the conveying force of the pressure of the auxiliary charge, or the gases are conducted into an engine in which air is admitted for completing the burning thereof.

A further object of the invention is to provide an apparatus for producing burnable gases and for burning these gases to produce thrust which includes a main and auxiliary charge arranged together so that the auxiliary charge will burn off at a faster rate and sublimate the main charge, and conduit means for conducting the gases thus formed under the pressure of the auxiliary charge gas burn-off into a combustion chamber having means for adding an oxidizer thereto.

A further object of the invention is to provide a missile rocket or ramjet thrust gas-producing device which includes a main charge and an auxiliary charge arranged together and of material such that the auxiliary charge will have a relatively rapid burn-off to cause a sublimation of the main charge and the movement of the gases thus produced into a combustion chamber and wherein the pressure forces of the gases created by the burn-off are used to pump an oxidizer into the combustion chamber or the gases are directed into a combustion chamber in which air is admitted such as by the action of air passing through the device during a flight when incorporated in an object such as a flying body or missile.

A further object of the invention is to provide an apparatus for producing thrust gases for thrust engines which are simple in design, rugged in construction and economical to manufacture.

The various features of novelty which characterize the invention are pointed out with particularity in the claims annexed to and forming a part of this specification. For a better understand of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a partial elevational and partial longitudinal sectional view of a lithergole engine constructed in accordance with the invention;

FIG. 2 is a view similar to FIG. 1 of a missile having ramjet engines and constructed in accordance with the invention.

DETAILED DESCRIPTION OF THE EMBODIMENTS

Figure 3:
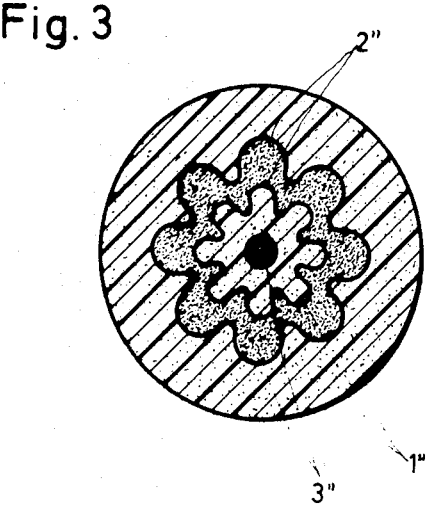
FIGS. 3 to 6 are enlarged transverse sectional views of combinations of auxiliary and main propellant charges arranged in accordance with various modifications of the arrangement indicated in FIGS. 1 and 2.

Referring to the drawings, in particular, the invention embodied therein as indicated in FIG. 1 is incorporated on a missile generally designated 40 which carries a solid-fuel combustion assembly generally designated 42 in a central area thereof.

In accordance with the invention, the propellant charge assembly 42 comprises a main propellant charge 1 and an auxiliary propellant charge 3 which is separated from the main charge by insulation or insulation means 2. The insulation may be any lightweight heat insulation material serving to permit the burn-off only on the front face and to prevent burn-off in the space between the individual charges 1 and 3. The auxiliary propellant charge presents a high thermal efficiency and will burn off relatively rapidly in respect to the main charge 1. The main charge 1 comprises a material of low heat of fusion and evaporation, for example, polyethylene, paraffins having more than eight carbon atoms, paraffin derivatives such as wax and alcohols, acids such as stearic and paraffin acids and their esters of nitric acid. The auxiliary propellant charge 3 is ignited by a fuse device (not shown) and it burns off as a front burner. The resultant heat melts and evaporates the contiguous main propellant charge 1. By this process, which is similar to the burn-off of a candle, burnable gases are produced which are passed through a collecting chamber 9 arranged below the charge 42 and directed by their own pressure force into a conveying duct or conduit 4 for delivery through a discharge aperture 5 provided at the opposite end thereof into a combustion chamber 6.

A feature of the construction indicated in FIG. 1 is that the pressure of the burnable gases which are produced acts on an annular piston 7 which floats on a liquid oxidizer supply 8 arranged between the chamber 9 and the combustion chamber 6. The oxidizer chamber is bound at its opposite end by a fixed or solid bottom 10 having nozzles or injectors 11 through which the oxidizer 8 is directed by the force of the gases as they are produced acting on the piston 7. The burnable gases which flow into the combustion chamber 6 and the injected oxidizer burn and produce thrust gases which are directed outwardly to the open end of the nozzle formation 12. By the arrangement of the oxidizer supply 8 behind the propellant charge in respect to the direction of flight of the missile 40, a particularly advantageous and simple construction of the drive system is obtained, especially with regard to the feed of the burnable gases which are produced and of the feed of the oxidizer to the combustion chamber.

In the embodiment indicated in FIG. 2, there is provided a missile generally designated 44 which carries a plurality of ramjet engines 13, 13 which are, in the embodiment illustrated, arranged with their axes parallel about the central body portion 14. The propellant charge 45 includes a main propellant charge 1' and an auxiliary propellant charge 3' contained therewithin but separated therefrom by a burn-off insulation 2'. The propellant charge assembly 46 is maintained in the rear end of the missile 44, and the gases which are produced from the propellant charge combination 1 and 3 are conveyed from the collecting zone 9', defined directly above the propellant charge 46, through the connecting lines 15, 15. Each connecting line 15 terminates in a nozzle 16 which is arranged to direct the gas axially along an elongated combustion chamber 17 of the associated ramjet engine 13. The gases are burned with compressed air which enters through air inlets or diffusers 18 arranged at the forward end of the combustion chamber 17 to draw air in through the chamber. The gases which are burned are then discharged through the thrust nozzles 19.

In order to obtain as good a heat contact as possible between the auxiliary propellant charge 3 and the main propellant charge 1 and hence a good preparation of the burnable gases, it is advantageous to make the contact surfaces between these charges very large, that is, to form a high ratio between circumferential length and cross-sectional surface. As indicated in FIG. 3, for this purpose, the auxiliary propellant charge 3'' may be profiled in a star-shaped configuration as a front turner and be enveloped by the main propulsion charge 1' both internally and externally. The burn-off insulation 2'' between the two propellant charges 1'' and 3'' serves to insure an exact front burn-off.

Figure 4:
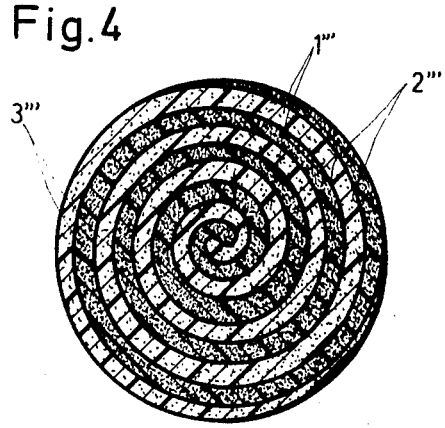
Figure 5:
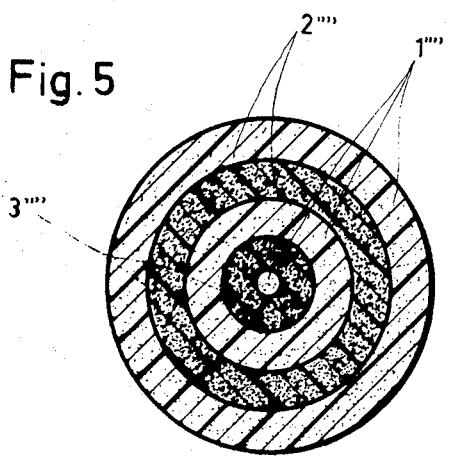
Figure 6:
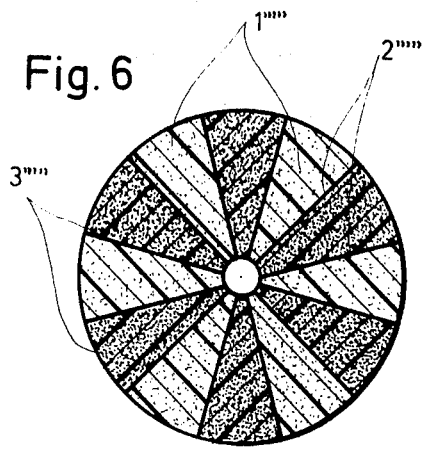

In FIG. 4, an alternate embodiment is shown wherein the auxiliary propulsion charge 3''' and the main propulsion charge 1''' are alternately arranged in spiral layers. FIG. 5 shows an arrangement in which the layers of the main charge 1'''' and the auxiliary charge 3'''' are arranged in concentric annular layers. And lastly, the arrangement of FIG. 6 shows the charges in the form of sectors which are alternately arranged proceeding radially. FIGS. 3–5 show front burner constructions, but the embodiment of FIG. 6 shows an internal burner arrangement and the area ratio between the main charge 1''''' and the auxiliary charge 3''''' is in accordance with the heat requirement of the main propellant charge which is employed. A particularly suitable propulsion charge for the main charge is a solid propellant formed of a compound rich in hydrogen and carbon and which requires little heat for its transformation form the solid to the gaseous state.

While specific embodiments of the invention have been shown and described in detail to illustrate the application of the inventive principles, it will be understood that the invention may be embodied otherwise without departing from such principles.

What is claimed is:

1. A device for producing burnable gases under pressure for thrust engines comprising wall means defining a charge chamber, a charge assembly comprising an auxiliary charge of high thermal efficiency arranged adjacent a main charge of a material of low heat of fusion and evaporation, burn-off insulation means disposed between said main and auxiliary charges for permitting burn-off of said auxiliary charge and the heating and sublimation of said main charge thereby, but without burn-off, and conduit means for delivering the gases produced by the burn-off of said auxiliary charge from said chamber to a combustion chamber under the conveying force of the pressure of the gases produced by the burn-off said auxiliary charge.

2. A device according to claim 1 wherein said main charge comprises a paraffin.

3. A device according to claim 1 wherein said main charge comprises a paraffin derivative such as wax and alcohol.

4. A device, according to claim 1, wherein said conduit means includes a collecting chamber defined directly adjacent one side of said combined charge, a combustion chamber spaced from said collecting chamber, said conduit means further including a conveying duct connected between said collecting chamber and said combustion chamber for delivering the gases formed in said collecting chamber by the burn-off of said auxiliary charge through said duct and into said combustion chamber.

5. A device, according to claim 4, including means defining an oxidizer storage chamber between said collecting chamber and said combustion chamber, said oxidizing chamber having a wall defining at least one opening for discharging oxidizer therefrom into said combustion chamber, and piston means exposed to the gases in said collecting chamber and being movable thereby through said oxidizing chamber to direct oxidizer from said oxidizing chamber into said combustion chamber.

6. A device, according to claim 1, including a ramjet engine having means for admitting air through one end, an intermediate combustion chamber and a nozzle section for the discharge of gases burned in said intermediate combustion chamber defined adjacent said charge assembly, and said means for delivering gases produced by the burn-off of said auxiliary charge being connected into said combustion chamber.

7. A device, according to claim 1, wherein said main combustion charge comprises at least one of the following materials: polyethylene, paraffins having more than eight carbon atoms, paraffin derivatives such as wax and alcohols, acids such as stearic and paraffin acids and esters of nitric acid.

8. A device, according to claim 1, wherein said combined charge is of tubular configuration and wherein the area between said main charge and said auxiliary charge is chosen to provide a high ratio between circumferential length and cross-sectional surface.

9. A device, according to claim 1, wherein said main charge and auxiliary charge are arranged one within the other and are of substantially star-shaped cross section.

10. A device, according to claim 1, wherein said main and auxiliary charges are arranged one within the other in successive spiral layers.

11. A device according to claim 1, wherein said main and auxiliary charges are arranged one within the other in tubular configuration.

12. A device, according to claim 1, wherein said main and auxiliary propellant charges comprise internal and external burner parts separated from each other by burn-off insulation layers.

13. A device, according to claim 1, wherein said main and auxiliary charges are arranged one within the other in successive layers arranged in the direction of desired burn-off.

14. A rocket engine comprising a body defining an internal thrust gas combustion chamber leading to a thrust nozzle at its rear end, a compartment defined within said body, an expansion chamber adjacent to and communicating with said compartment, an oxidizer chamber between said expansion chamber and said combustion chamber, a conduit communicating between said expansion chamber and said combustion chamber, a propellant charge in said compartment comprising an auxiliary propellant charge of high thermal efficiency arranged adjacent a main propellant charge of a material of low heat of fusion and evaporation, burn-off insulation means disposed between said main and auxiliary charges for permitting burn-off of said auxiliary charge and the heating and sublimation of said main charge thereby, but without burn-off, and conduit means for delivering the gases produced by the burn-off of said auxiliary charge from said chamber to a combustion chamber under the conveying force of the pressure of the gases produced by the burn-off of said auxiliary charge.

15. A flying body comprising a central body portion, a charge contained in said body portion comprising a main charge of material of low heat of fusion and evaporation arranged directly adjacent an auxiliary charge of high thermal efficiency, burn-off insulation means disposed between said main and auxiliary charges for permitting burn-off of said auxiliary charge and the heating and sublimation of said main charge thereby, but without burn-off, at least one ramjet engine affixed to said body and having an opening at one end for the inflow of air therethrough and a thrust nozzle discharge at the opposite end, and means communicating between said body adjacent said charge and said ramjet engine for delivering the burnable fuel which is produced by the burn-off of said auxiliary charge and the heating of said main charge thereby into said ramjet engine under the conveying force of the pressure of the gases produced by the burn-off of said auxiliary charge.

16. A rocket engine, according to claim 14, including a piston separating said oxidizing chamber from said expansion chamber and being movable by the burnable gases generated in a direction away from said expansion chamber toward said combustion chamber to pressurize the oxidizer in said oxidizer chamber, and nozzle means defined between said oxidizing chamber and said combustion chamber for directing oxidizer from said oxidizing chamber to said combustion chamber under the force of action of the compression of said piston.

17. A flying body, according to claim 15, including a plurality of ramjet engines arranged around said central body, a collecting chamber defined in said central body adjacent one end of said propellant charge, and means communicating between said collecting chamber and each of said ramjet engines for delivering fuel from said collecting chambers into said ramjet engines under the force of pressure developed by the burning of said auxiliary charge.

* * * * *